United States Patent Office 3,759,723
Patented Sept. 18, 1973

3,759,723
PROCESS FOR MAKING A DEHYDRATED
MEAT PRODUCT
Sam Gunson, Pavenham, Alan Heyes, Oakley, and Anthony John Hanson Sale, Sharnbrook, England, assignors to Lever Brothers Company, New York, N.Y.
No Drawing. Filed Sept. 4, 1970, Ser. No. 69,952
Int. Cl. A23b 7/02
U.S. Cl. 99—208     3 Claims

ABSTRACT OF THE DISCLOSURE

Dried meat products are prepared by forming a mix containing uncooked comminuted meat and a comminuted starchy vegetable or cereal material which retains the cellular structure of the vegetable. This mix is shaped, heat-set and dehydrated by air drying, to form a product in which the vegetable material is bound in a matrix formed by the heat-set meat.

---

This invention relates to dehydrated meat products.

There is a demand for dried meat products which will rehydrate quickly to give a product having a texture simulating that of intact meat. However, such products are difficult to obtain. Intact, that is to say uncomminuted, meat cannot be dried to yield a product which will rehydrate successfully. When comminuted cooked meat is dried it is capable of rehydration but it will not bind together to form a product which simulates the texture of natural meat. Dehydrated meat products may be prepared from comminuted raw meat by shaping and heat setting the comminuted raw meat and then drying the shaped and set meat. If such a product is dried and rehydrated successfully it may imitate closely the texture of freshly cooked intact meat. However, problems of shrinkage of the product, slowness of rehydration and incomplete rehydration are encountered. It is an object of the invention to provide a product which has improved dehydration and rehydration properties in that it shrinks less on dehydration and on rehydration takes up water more easily and quickly to give a more succulent product and more consistently achieves the desired texture simulating freshly cooked intact meat.

The invention provides a coherent shaped dehydrated foodstuff comprising heat-set comminuted meat and a comminuted starchy vegetable material in a form retaining the cellular structure of the vegetable, the vegetable material being bound in a matrix formed by the heat-set meat.

The invention also provides a method of making a dehydrated meat product comprising (i) forming a mix containing uncooked comminuted meat and a comminuted starchy vegetable material in a form retaining the cellular structure of the vegetable; (ii) shaping the mix; (iii) heating the shaped mix so as to set the protein of the meat about the vegetable material and from a matrix binding it; and (iv) dehydrating the heat-set shaped mix.

Our most preferred vegetable material is dehydrated potato. The dehydrated potato should be the kind which will rehydrate to form mashed potato, rather than potato flour which does not retain the cellular structure of the potato and which merely forms a paste on addition of water. The dehydrated potato may be in the form of powder, granules or flakes. The term "vegetable material" as used herein includes cereals, and alternative materials that may be used are rice grains, barley grains or semolina. Apple may also be used where its flavour is not objectionable. The vegetable material is preferably coarsely comminuted so that it retains intact endosperm cells but is preferably sufficiently comminuted that the particles of vegetable material are not visible in the dried product. The particles of vegetable material preferably have their largest dimension between 0.05 and 3 mm., more preferably between 0.1 and 1 mm. The vegetable material is preferably in a dry condition when it is mixed with the meat. The vegetable material is preferably pre-cooked, so that the starch it contains is at least partly gelatinised. This removes any possibility of raw starch, which we have found to be deterimental to dehydration, being released in the product to be dried.

The proportion of the vegetable material added to the meat is preferably between 5 and 15, expressed as the dry weight of the vegetable material in the mix. This corresponds to an amount of 10 to 35% by weight of the vegetable material in the dried product. Larger amounts of vegetable material than this while giving a product which will dry and rehydrate successfully are not desired since the resulting products do not have the required meat-like texture. Smaller proportions of the vegetable material, for example 2 to 5% by weight of the mix may be used if comminuted cooked meat is present in the mix as well as comminuted raw meat and a very short rehydration time is not required.

Any variety of meat can be used, for example beef, pork, lamb, chicken or mixtures of these, fish, such as cod or haddock, or shell fish such as prawn. The meat used must be capable of binding with itself to form a coherent mass and therefore at least some of the meat used must be raw or meat which has been only slightly blanched. The meat is preferably comminuted by a colloid mill into a fibrous paste or by a bowl chopper. If a dehydrated meat product having a coarser texture is desired minced meat may be used.

The fat content of the mix formed should preferably be from 4 to 20% by weight, more preferably 8 to 13% when producing dried products having a normal rehydration time of around 10 minutes. If the meat used has a fat content of below 4% by weight, for example when fish or shell fish is used, it may be advantageous to add a hard fat so that the fat content of the mix is within this preferred range. Examples of fats which can be added are hardened vegetable oils such as hardened palm oil, hardened groundnut oil, and hardened cottonseed oil, or hard fats derived from animal sources such as refined beef tallow, fractionated beef tallow of hardened oleo oil derived from tallow. The fat preferably has a melting point (slip point) of at least 35° C. but below 85° C.

The use of a cellular vegetable material, according to the invention, is a simple and inexpensive method, needing no extra processing step, of obtaining a meat product which will readily and consistently rehydrate to a firm meat-like texture. Such a meat product, for example in the form of balls of 2 cm. diameter will rehydrate fully in about 5 to 10 minutes. If it is desired to produce a product which will rehydrate more quickly than this, the formulation of the mix which is heat-set and dehydrated is adapted to give the dried product a more porous texture. The mix may contain cooked comminuted meat, or may have fat or water added to it so that the fat or water content of the mix is greater than that of raw meat.

Cooked comminuted meat has lost its binding powers before it is incorporated into the mix and it appears in the dried product as separate particles bound within the matrix of heat-set meat derived from the raw meat. The cooked meat is generally more coarsely comminuted than the raw meat which is required to act as a binder. The cooked meat should, preferably however, have a particle size less than 10 mm. in any direction since individual particles of cooked meat larger than this will not rehydrate very quickly. The particles are preferably elongated, as obtained when comminuted by means having a tearing as well as a cutting action. The amount of cooked meat which is incorporated into the mix can be varied within wide limits as the cooked meat hardly detracts from the meat-like texture of the rehydrated product and the upper limit to the amount of cooked meat which may be added is determined by the necessity that sufficient comminuted raw meat should be present in the mix to form a firm matrix when heat set for the other ingredients. The amount of cooked meat used is preferably 20 to 60% by weight of the total weight of cooked and raw meat.

The fat content of 8 to 13% by weight of the mix which is preferred for a dried product having a rehydration time of about ten minutes may be increased to about 20 to 30% when a quickly rehydrating product is desired. This is generally achieved by adding a hard fat to the mix, for example a hardened vegetable oil such as hardened palm oil, hardened groundnut oil or hardened cottonseed oil, or a hard animal fat such as refined or fractionated tongue or oleo oil derived from it. The presence of this large amount of fat results in the loss of a considerable amount of fat in the heat-setting step. When these high amounts of fat are used the mix after cooking of the meat tends to contain 12 to 15% by weight of fat. The draining away of this fat leaves pores in the matrix of heat-set meat which remain on dehydration and which enable water to be taken up more quickly on rehydration.

When preparing a dried product having a normal rehydration time, it is preferable not to add water to the mix which is set and dehydrated, since any added water has to be removed again on dehydration and moreover the resulting dried product is made more fragile. However, the dried product formed from a mix containing added water is also more porous and a more quickly rehydrating dried meat can be prepared if water is added to the mix before heat-setting. If cooked meat is also present in the mix the water used may be the liquor resulting from the cooking process. The amount of water added should generally not exceed 15% by weight of the mix since more water than this results in a tendency to form a sloppy mix which is difficult to shape and set, particularly if extrusion or ball-forming methods are used.

The use of a comminuted cooked meat ingredient, or the addition of extra fat and water can reduce the rehydrating time of the dried product to below the normal time for a dried product formed from a mix containing only comminuted raw meat and a cellular vegetable material, which is approximately 10 minutes. Any of these can be used in combination. If a mix is formed which contains 5 to 15% of a cellular vegetable material according to the invention, comminuted cooked meat in an amount approximately 40 to 60% by weight of the total meat content of the mix, from 20 to 30% total fat (added fat and fat present in the meat) and from 5 to 15% added water, a dried meat product may be obtained which rehydrates in a time as short as 0.5 to 1 minute. Such a rehydration time is considerably shorter than has been achieved with prior art methods using cooked and raw meat only as ingredients.

When the mix which is to be dried is being prepared, the meat is preferably at least partly comminuted before being mixed with the vegetable material. The vegetable material can be mixed with any other dry ingredient before it is added to the meat. One preferred form of mixing the meat with the vegetable material uses a power mixer fitted with a dough hook. The mixture thus formed, which may be a granular product similar to minced meat, or a dough-like paste, or of the consistency of sausage meat, may be shaped by any conventional means.

In one form of the invention a paste of milled raw meat and potato powder is formed into a cylinder, for example by means of a sausage stuffer. This cylinder of meat mix is sub-divided into balls, for example by the apparatus described in British patent specification 541,188. This apparatus consists of a pair of rollers which are provided with uninterrupted peripheral grooves registering with each other, the edges of the grooves being substantially in rolling contact with each other so that moulding apertures are formed between the rollers. The rollers preferably rotate at different surface speeds in the same direction, with the roller moving into the nip rotating faster than that moving out of the nip. The apparatus may have a third grooved roller situated below the other two, with the edges of the grooves being substantially in rolling contact with the edges of the grooves on each of the other two rollers, so that the balls formed are subjected to a second moulding process before leaving the apparatus. It may be convenient for the drying procedure to produce meat balls having a diameter of about 2 cm. by this method and when balls of this size are produced, it is preferred to use 8 to 10% by weight of the potato powder or other cellular material. The balls are blanched in steam or in water at 85 to 100° C. to heat-set the meat protein. The balls may be heated in a water blancher placed beneath the nip of the grooved rollers of the ball forming apparatus so that the meat balls fall into the water.

It will be appreciated that there are many alternative ways of shaping and cooking the meat product. For example the meat mix may be extruded as a sheet whereby it is at least partly heat-set. The extruded sheet may be treated with steam to cook the meat protein further. The sheet which is extruded is preferably 0.5 to 2.5 cm. thick. After it is set the sheet may be cut or broken into pieces, for example pieces having a volume of 1 to 10 cc. before drying. Alternatively, the meat mix may be cooked in moulds and then sub-divided. Methods of heat-setting involving "dry blanching" may be used. For example the product may be wrapped in foil and steam heated, or may be heated with air at a high temperature and high humidity. This method of heat-setting has the advantage that the loss of materials from the meat by leaching is greatly reduced.

Drying of the products preferably takes place using air at a temperature of 50 to 95° C., more preferably about 90° C. The meat products are dried to a stable moisture content of below 10%, preferably about 5 to 6% by weight. The meat products, for example meat balls formed as described above or pieces cut from an extruded sheet, are preferably spread on perforated trays whilst in the dryer. If cooking takes place using air at a high temperature and high humidity, drying may take place using the same apparatus, but reducing the moisture content of the air in contact with the meat product.

The dried meat products of the invention may be used as meat ingredients for dried meals, for example in combination with spaghetti, rice or macaroni and dried vegeables and flavouring, or for dry soup mixes. The dried meat products having a low rehydration time may be used as ingredients of quick cooking soups, and those capable of rehydration in 1 minute or less can be used as ingredients of "instant" soup mixes such as soup mixes used in vending machines.

The invention is illustratde by the following examples in which percentages are by weight.

EXAMPLE 1

This example describes the formation of dried meat balls having the following formulation:

|  | Percent |
|---|---|
| Frozen forequarter beef | 89.2 |
| Dehydrated potato powder | 8.0 |
| Salt | 1.1 |
| Flavouring agents | 1.7 |

The frozen meat was sliced and was then comminuted to a fibrous paste using a colloid mill fitted with a plate having 8 mm. holes. The dry ingredients were thoroughly mixed together and were then mixed with the meat in a Hobart mixer fitted with a dough hook. When the ingredients were thoroughly mixed, the resulting paste was formed into a cylinder using a sausage stuffer. This cylinder of mix was dropped sideways on into the nip formed between two fluted drums. These drums were rotating in the same direction with the drum rotating into the nip moving at about three times the speed of the drum rotating out of the nip. The meat mix was thereby formed into balls which dropped down through the nip onto a conveyor belt which carried them through a water blancher. The meat balls were branched for about 6 minutes in water at 90° C. after leaving the blancher the meat balls were allowed to drain whilst being conveyed to a drier. They were then air dried at 90° C. for 4 hours. The dried meat balls formed had a good shape and had a moisture content of 5 to 6%.

The dried meat balls were rehydrated by simmering in water for 10 minutes and were found to have a very pleasant meat-like texture. Their rehydration ratio (weight of rehydrated product: weight of dried product) varied between 2.4 and 2.6.

EXAMPLE 2

This example illustrates the use of various starch-containing materials in producing dried pork balls. Samples 1 to 6 included comminuted pre-cooked starchy vegetable materials which retained the cellular structure of a vegetable and are thus examples of the invention. Samples 7 to 15 did not include such a material and are included as comparative examples. Samples 7 to 11 included a pre-cooked starchy material which did not have a cellular structure and samples 12 to 15 included raw starch.

The formulation used in preparing the pork balls was:

|  | Percent |
|---|---|
| Milled spare rib pork | 90 |
| Starchy ingredient | 8.5 |
| Salt | 1.0 |
| Flavouring agents | 0.5 |

The frozen meat was chopped into about 2.5 cm. cubes, was minced through a 5 mm. plate and was then comminuted by milling in a colloid mill. The milled meat and the additives were mixed in a Hobart bowl mixer for 4 minutes. The mixer then extruded through a tube with a 2 cm. diameter into rods approximately 38 cm. long using a piston stuffer. The rods were then dropped into the ball forming machine, described in Example 1, and the resulting balls were blanched for 8 minutes at 90° C., were water cooled and were air dried in a bin dryer at 55° C. for 16 hours, using a small bed depth and air flow of approximately 120 metres per minute. The dried meat balls were subsequently rehydrated by simmering in water for 5 minutes.

The results obtained are tabulated below:

It is thus seen that the products of the invention (samples 1 to 6) were capable of rehydration to give a succulent product having a meat-like texture, whereas when the cellular materials used in the invention were replaced by cooked starches without a cellular texture it was not possible to obtain a coherent dried product and when raw starches were used the dried product became tough and case hardened and would not rehydrate properly.

Storage tests were carried out on the dried products obtained in sample 1 and sample 12. The dried products were stored separately in screw top glass jars. The products obtained in sample 1 showed no signs of spoilage on storing after 10 months, and when rehydrated were found to have no off flavour. The products of sample 12, however, became mouldy on storing within 12 months since it had not been possible to dry the centre of the balls successfully.

EXAMPLE 3

Dried beef balls were produced using the following formulation:

|  | Percent |
|---|---|
| Milled forequarter beef | 89.5 |
| Dried potato powder | 8.0 |
| Salt | 1.1 |
| Flavourings | 1.4 |

The process used to prepare the dried balls and to rehydrate them was the same as that used in Example 2. As a comparison dried beef balls were produced by the same process using corn flour in place of the dried potato powder, and also with no additives.

The total solids content of the balls was measured firstly after cooking and before drying, and secondly after drying and rehydration. The following results were obtained:

| Starch ingredient used | Solids content of cooked balls, percent | Solids content of rehydrated balls, percent |
|---|---|---|
| Potato powder | 31 | 33.6 |
| Corn flour | 31 | 52.3 |
| No starch ingredient | 34.4 | 45.6 |

The three samples had very similar solids contents before drying. After drying and rehydration, however, the sample containing potato powder was found to have a much lower solids content and this solids content was very similar to that of the balls before drying. The other samples had higher solids content after drying and rehydration, and it was thus found that only the balls containing potato powder were fully rehydrated.

| Sample No. | Starch ingredients | Results of experiment |
|---|---|---|
| 1 | Dehydrated potato powder | The balls dried and rehydrated well, and had a rehydration ratio of 2.6. Both before and after rehydration, the balls were even and smooth surfaced. The rehydrated balls had a good meat-like texture. |
| 2 | Dehydrated potato flakes | As in 1, even smooth surfaced balls were obtained which consistently rehydrated well having a rehydration ratio of 2.6 and a good texture after rehydration. |
| 3 | Pre-cooked rice grains (partly ground). | The balls both before and after rehydration had a good appearance and rehydrated well with a rehydration ratio of 3.0. The rehydrated balls had a succulent texture. |
| 4 | Pre-cooked barley | The balls had a good appearance and rehydrated well. The rehydrated balls had a texture which was succulent but slightly dryer than that obtained in sample 3. The rehydration ratio was 2.7. |
| 5 | Apple nuggets | The balls rehydrated well and had a good meat-like texture. There was a slight apple flavour present, but this was not considered objectionable by the tasters. The rehydration ratio was 2.1. |
| 6 | Semolina flour | Similar results to samples 1 to 5 were obtained with good rehydration and texture. The rehydration ratio was 2.6. |
| 7 | Pre-cooked corn flour | The samples totally disintegrated during the cooking stage and dried meat balls could therefore not be obtained. |
| 8 | Pre-cooked farina | Both the dried and the rehydrated balls had an undesirable ragged appearance and there was a tendency to disintegration. The rehydrated samples had a soft pasty texture. The rehydration ratio where this could be measured was 2.3. |
| 9 | Pre-cooked chemically modified waxy maize starch. | The samples disintegrated during the cooking stage as in sample 7. |
| 10 | Pre-cooked tapioca | The samples gradually disintegrated during the cooking and drying procedures. |
| 11 | Pre-cooked wheat flour (biscuit type). | The samples disintegrated similarly to sample 10. |
| 12 | Raw farina | The samples became a case hardened on drying and did not dry or rehydrate successfully. The dried balls had a hard outer surface and a centre portion which was sometimes quite wet. The samples had a very tough and unpleasant texture after rehydration. The rehydration ratio was 1.4. |
| 13 | Raw corn flour | The samples became case hardened on drying and had a similar unpleasant texture to sample 12. The rehydration ratio was 1.8. |
| 14 | Raw wheat flour | Unsuccessful drying and rehydration, together with case hardening similar to samples 12 and 13. The rehydration ratio was 1.7. |
| 15 | Raw tapioca | Similar results obtained to samples 12 to 14. The rehydration ratio was 1.6. |

The size and density of the dried balls was also measured. The results are as follows:

| Starch ingredient | Weight of 35 balls in grams | Volume of 35 balls in cc. | Density of balls |
| --- | --- | --- | --- |
| Potato powder | 60.8 | 63.3 | 0.96 |
| Corn flour | 62.3 | 53.5 | 1.16 |
| No starchy ingredient | 41.1 | 41.3 | 1.00 |

It was thus found that the balls containing potato powder were half as large again after drying as the balls containing no additive, since the latter had shrunk considerably during heat-setting and drying. There was a loss of material from the mix which was substantially all meat which was prevented by the inclusion of potato powder in the mix. The dried balls containing corn flour did not show this loss of material, but these too had shrunk after heat-setting and drying and had a higher density than the balls containing potato powder which resulted in a much poorer performance on rehydration.

EXAMPLE 4

Dried fish balls were produced from a mix having the following formulation:

| | Percent |
| --- | --- |
| Milled cod | 76.5 |
| Dehydrated potato powder | 8.5 |
| Hardened fat | 10.5 |
| Albumin | 2.0 |
| Salt | 1.0 |
| Sodium alginate | 1.0 |
| Monosodium glutamate | 0.5 |

The milled raw cod was mixed with the other ingredients, formed into balls and blanched by the methods described in Example 1. The cooked balls were then transferred to a through draught bin drier with an air flow of 120 metres per minutes and were dried for about 10 hours at 55° C. The cod balls produced retained their shape well on drying and showed good binding and good rehydration. Similar experiments were carried out using haddock and smoked haddock in place of cod. In these experiments also the fish balls produced dehydrated and rehydrated successfully.

EXAMPLE 5

Dehydration fish pieces were produced using an extrusion method from a mix having the following formulation:

| | Percent |
| --- | --- |
| Minced raw cod | 82.5 |
| Dehydrated potato powder | 8.0 |
| Hardened fat (hardened palm mixture) | 7.0 |
| Salt | 1.0 |
| Monosodium glutamate | 0.5 |

Skinned fish fillets were minced through a 5 mm. plate. The minced fish was mixed with the other ingredients in a Hobart mixer for about 4 minutes until the mix was homogenous. The mix was then extruded through a Wetter stuffer fitted with a nozzle 30 cm. x 2.5 cm. x 08 cm. The extruded strip was heat-set in a steam oven at a slightly positive pressure for 8 minutes.

The heat-set strips were broken into pieces and were dried in a bin drier at 55° C. for 10 hours, using an air flow of about 120 metres per minute. The dried cod pieces were produced could be successfully rehydrated by simmering in water for 10 minutes.

EXAMPLE 6

Dried haddock pieces were produced using an extrusion method and a high temperature high humidity apparatus from the following mix:

| | Percent |
| --- | --- |
| Minced skinned haddock fillets | 78.5 |
| Dehydrated potato powder | 9.5 |
| Hardened fat (hardened palm mixture) | 9.5 |
| Salt | 1.0 |
| Monosodium glutamate | 0.5 |

The minced skinned haddock fillets were mixed with the other ingredients and extruded as a strip as described in Example 5. This extruded strip was then heated for 15 minutes in a high temperature high humidity apparatus having a wet bulk temperature of 85° C. and a dry bulk temperature of 110° C. The heat-set strips produced by this method were dryer than those produced in Example 2.

The heat-set strips were broken into pieces and dried in a bin drier at 55° C. for 10 hours with an air flow of 120 metres per minutes, and dehydrated haddock pieces which could be successfully rehydrated were obtained.

EXAMPLE 7

Dried beef pieces were prepared from a mix having the following formulation:

| | Percent |
| --- | --- |
| Cooked minced forequarter beef | 40 |
| Raw milled forequarter beef | 35 |
| Hard fat (hardened palm mixture) | 10 |
| Water | 9 |
| Dried potato powder | 6 |

Frozen forequarter beef was chopped into approximately 2.5 cm. cubes and these were separated into two portions. The first portion was cooked by autoclaving for 1 hour at 15 p.s.i. and was then minced through a 5 mm. Hobart mincer plate. The second portion was first comminuted by mincing through a 5 mm. Hobart mincer plate and was then finely milled in a colloid mill. The two meat components were then mixed with the fat, water and potato powder for 4 minutes in a Hobart bowl mixer.

The mix was then extruded through a 5 cm. x 1.25 cm. cross-section nozzle attached to a piston stuffer. The extruded strips were steam heated for 8 minutes and were then broken into irregular pieces by hand and were dried for 16 hours at 55° C. in a bin drier using a small bed depth and an air flow of about 120 metres per minute.

The meat pieces produced were rehydrated by pouring boiling water onto them. After only half a minute the meat pieces had rehydrated well to a pleasant meat-like texture. The rehydration ratio measured after only half a minute was 2.5.

This experiment was repeated except that the beef was replaced with deboned chicken meat containing skin, fat, and meat in their natural ratio. Once again chicken pieces were produced, which rehydrated well in half a minute to a meat-like texture. The chicken pieces had a rehydration ratio of 2.3 after half a minute.

We claim:
1. A process of making a dehydrated meat product comprising the steps of:
 (i) mixing uncooked comminuted meat with
  (a) 20 to 60 percent by weight based on the total meat content of the mix of a comminuted pre-cooked meat, and
  (b) 5 to 15 percent based on the total weight of the mix of a dry pre-cooked starchy vegetable material which has been coarsely comminuted to particles retaining the cellular structure of the vegetable and having their largest dimension between 0.1 and 3 mm. to form a mix in which the comminuted pre-cooked meat and the pre-cooked starchy vegetable material are distributed throughout the uncooked comminuted meat,

(ii) moulding the mix to a desired shape,
(iii) heating the mix so as to set the protein of the meat to a matrix which will retain the shape imparted in step (ii) and which has the particles of comminuted meat and pre-cooked starchy vegetable material bound within it, and
(iv) air drying the heat set shaped mix prepared in step (iii) to a stable moisture content of below 10%.

2. A process according to claim 1 in which the vegetable material is dried potato in the form of powder, granules or flakes.

3. A process according to claim 1 in which the comminuted pre-cooked meat is more coarsely comminuted than the uncooked comminuted meat.

References Cited

UNITED STATES PATENTS

| | | | |
|---|---|---|---|
| 554,269 | 2/1896 | Hetherington | 99—208 X |
| 2,457,063 | 12/1948 | Morgan et al. | 99—208 |
| 3,067,043 | 12/1962 | Marsh et al. | 99—208 |
| 3,083,108 | 3/1963 | Kline et al. | 99—208 |
| 3,150,985 | 9/1964 | Buscemi et al. | 99—208 |
| 3,309,207 | 3/1967 | Tuomy et al. | 99—208 X |
| 3,447,929 | 6/1969 | Hale | 99—18 X |
| 3,520,701 | 7/1970 | Rendek | 99—208 |
| 2,363,864 | 11/1944 | Horvath | 99—208 X |

FOREIGN PATENTS

| | | | |
|---|---|---|---|
| 684,962 | 4/1964 | Canada | 99—208 |

S. LEON BASHORE, Primary Examiner

F. FREI, Assistant Examiner

U.S. Cl. X.R.

99—108